United States Patent
Tsuchiya et al.

(10) Patent No.: US 10,215,123 B2
(45) Date of Patent: Feb. 26, 2019

(54) ENGINE CONTROLLING APPARATUS

(71) Applicant: MITSUBISHI JIDOSHA KOGYO KABUSHIKI KAISHA, Tokyo (JP)

(72) Inventors: Akihiro Tsuchiya, Tokyo (JP); Mitsuhiro Yuasa, Tokyo (JP); Kensuke Kondo, Tokyo (JP); Yuji Sato, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/099,674

(22) Filed: Apr. 15, 2016

(65) Prior Publication Data
US 2016/0312731 A1 Oct. 27, 2016

(30) Foreign Application Priority Data
Apr. 27, 2015 (JP) .................................. 2015-090031

(51) Int. Cl.
*F02D 41/24* (2006.01)
*F02D 41/14* (2006.01)
(Continued)

(52) U.S. Cl.
CPC ..... *F02D 41/2461* (2013.01); *F02D 41/1441* (2013.01); *F02D 41/1454* (2013.01);
(Continued)

(58) Field of Classification Search
CPC ............. F02D 41/2461; F02D 41/1441; F02D 41/402; F02D 41/3094; F02D 41/34;
(Continued)

(56) References Cited

U.S. PATENT DOCUMENTS 5,249,130 A * 9/1993 Mamiya .............. F02D 41/0025
123/681
5,867,982 A * 2/1999 Tengblad ........... B01D 53/8696
123/198 F
(Continued)

FOREIGN PATENT DOCUMENTS

DE 103 39 465 A1 3/2004
JP H06-272599 A 9/1994
(Continued)

OTHER PUBLICATIONS

"Development of Rich Air/Fuel Ratio Sensor Correction System"; Published Mar. 2005.*
(Continued)

*Primary Examiner* — Sizo Vilakazi
*Assistant Examiner* — Brian Kirby
(74) *Attorney, Agent, or Firm* — Birch, Stewart, Kolasch & Birch, LLP

(57) ABSTRACT

The engine controlling apparatus includes a selector, a setter, and a controller. The selector selects one of a plurality of injection modes according to the operating condition of an engine, where injection rates of a plurality of injectors or the number of injections performed in one stroke of the engine differs among the injection modes. The setter sets a mode correction amount that reflects an output characteristic of a first sensor corresponding to the injection mode. The controller performs feedback control using both a detection signal from the first sensor and the mode correction amount.

5 Claims, 3 Drawing Sheets

(51) Int. Cl.
*F02D 41/30* (2006.01)
*F02D 41/34* (2006.01)
*F02D 41/40* (2006.01)

(52) U.S. Cl.
CPC ..... *F02D 41/1456* (2013.01); *F02D 41/2467* (2013.01); *F02D 41/3094* (2013.01); *F02D 41/34* (2013.01); *F02D 41/40* (2013.01); *F02D 41/402* (2013.01); *Y02T 10/44* (2013.01)

(58) Field of Classification Search
CPC .. F02D 41/40; F02D 41/1456; F02D 41/2467; F02D 41/1454
USPC ......... 123/299, 478, 480, 486; 701/103, 104
See application file for complete search history.

(56) References Cited

U.S. PATENT DOCUMENTS

| | | | | |
|---|---|---|---|---|
| 6,035,839 A * | 3/2000 | Ohtani | F02D 41/068 | 123/685 |
| 6,041,593 A * | 3/2000 | Karlsson | F01N 3/0835 | 60/284 |
| 6,055,956 A * | 5/2000 | Nishimura | F02D 21/08 | 123/299 |
| 6,210,641 B1 * | 4/2001 | Yamada | F02D 41/0027 | 123/696 |
| 6,220,017 B1 * | 4/2001 | Tayama | F01N 11/007 | 60/277 |
| 6,340,014 B1 * | 1/2002 | Tomita | F02D 41/024 | 123/295 |
| 6,386,173 B1 * | 5/2002 | Yamamoto | F02D 41/024 | 123/295 |
| 6,981,487 B2 * | 1/2006 | Ohtani | F02D 41/3094 | 123/299 |
| 7,013,637 B2 * | 3/2006 | Yoshida | F02D 37/02 | 60/274 |
| 7,013,873 B2 * | 3/2006 | Oomori | F02D 41/008 | 123/299 |
| 7,146,963 B2 * | 12/2006 | Tahara | F02D 41/221 | 123/431 |
| 7,249,454 B2 * | 7/2007 | Ichise | F02D 41/0235 | 123/295 |
| 7,302,928 B2 * | 12/2007 | Satou | F02D 41/024 | 123/295 |
| 8,131,451 B2 * | 3/2012 | Aoki | F02D 41/1454 | 123/688 |
| 8,161,729 B2 * | 4/2012 | Katoh | F01N 11/00 | 60/277 |
| 8,744,729 B2 * | 6/2014 | Iwazaki | F02D 41/0085 | 123/673 |
| 2002/0013653 A1 * | 1/2002 | Ohyama | F01L 13/0036 | 701/103 |
| 2003/0041838 A1 * | 3/2003 | Tsuchiya | F02B 17/005 | 123/299 |
| 2003/0065438 A1 * | 4/2003 | Katoh | F02D 41/1403 | 701/104 |
| 2004/0040541 A1 * | 3/2004 | Goto | F02D 41/1486 | 123/445 |
| 2005/0098154 A1 * | 5/2005 | Ohtani | F02D 41/1498 | 123/431 |
| 2006/0075741 A1 * | 4/2006 | Shiraishi | F02D 41/024 | 60/285 |
| 2006/0207566 A1 | 9/2006 | Kobayashi | | |
| 2007/0017484 A1 * | 1/2007 | Kinose | F02D 41/3094 | 123/431 |
| 2007/0169746 A1 * | 7/2007 | Irisawa | F02D 41/008 | 123/431 |
| 2007/0261960 A1 * | 11/2007 | Aoki | F02D 41/1454 | 204/427 |
| 2008/0066449 A1 * | 3/2008 | Murata | B01D 53/9495 | 60/285 |
| 2008/0127640 A1 * | 6/2008 | Morita | F01N 3/0814 | 60/301 |
| 2009/0099753 A1 * | 4/2009 | Kaneko | F02D 41/1475 | 701/103 |
| 2009/0282810 A1 * | 11/2009 | Leone | F02D 19/081 | 60/285 |
| 2010/0108046 A1 * | 5/2010 | Nakagawa | F02D 41/1455 | 123/674 |
| 2010/0186391 A1 * | 7/2010 | Najt | B01D 53/8696 | 60/295 |
| 2010/0191444 A1 * | 7/2010 | Aoki | F01N 11/007 | 701/109 |
| 2011/0265758 A1 * | 11/2011 | Glugla | F02B 23/104 | 123/299 |
| 2012/0004828 A1 * | 1/2012 | Okazaki | F02D 13/0226 | 701/103 |
| 2012/0247422 A1 * | 10/2012 | Nagakura | F02D 41/1454 | 123/299 |
| 2012/0290192 A1 * | 11/2012 | Okazaki | F02D 41/1454 | 701/103 |
| 2013/0144510 A1 * | 6/2013 | Iwazaki | F02D 41/0085 | 701/104 |
| 2013/0297188 A1 * | 11/2013 | Watanabe | F02D 41/047 | 701/104 |
| 2014/0290219 A1 | 10/2014 | Kato et al. | | |
| 2015/0120170 A1 * | 4/2015 | Yamaguchi | F02D 41/1441 | 701/104 |
| 2015/0361913 A1 * | 12/2015 | Qi, I | F02D 41/1456 | 701/103 |

FOREIGN PATENT DOCUMENTS

| | | |
|---|---|---|
| JP | 2000-179380 A | 6/2000 |
| JP | 2004-084561 A | 3/2004 |
| JP | 2006-138252 A | 6/2006 |
| JP | 2007-231754 A | 9/2007 |
| JP | 2007-231810 A | 9/2007 |

OTHER PUBLICATIONS

Extended European Search Report dated Sep. 26, 2016 in counterpart European Patent Application No. 16166817.3.
Office Action dated Jan. 8, 2019 in corresponding Japanese Application No. 2015-090031.

* cited by examiner

ENGINE CONTROLLING APPARATUS

CROSS-REFERENCE TO THE RELATED APPLICATION

This application incorporates by references the subject matter of Application No. 2015-090031 filed in Japan on Apr. 27, 2015 on which a priority claim is based under 35 U.S.C. § 119(a).

FIELD

The present invention relates to an engine controlling apparatus that performs feedback control of an air-fuel ratio.

BACKGROUND

An engine (an internal combustion engine) that adapts two types of fuel injection modes which are the direct injection (cylinder injection) and the port injection (multi-port injection) has been developed. This engine selects one or both of a direct injector for injecting fuel in a cylinder and a port injector for injecting fuel in an inlet port according to the operating condition of the engine. For this type of engines, various techniques for selecting the fuel injection mode according to the engine speed and the load are proposed (for example, see JP 2006-138252 A).

SUMMARY

Technical Problems

The actual air-fuel ratio of mixed gas supplied into the cylinder is estimated according to the output of an air-fuel ratio sensor provided in an exhaust system of the engine. Feedback control of the fuel injection amount and the air intake amount of the engine is performed so as the actual air-fuel ratio to be identical to a desired target air-fuel ratio. A known specific example of the air-fuel ratio sensor is a linear air-fuel ratio sensor that is configured with a solid electrolyte covered with a porous material that limits the rate of exhaust gas dispersion. The linear air-fuel ratio sensor measures the electromotive force generated by oxygen ions traveling in the solid electrolyte and estimates the air-fuel ratio corresponding to the oxygen concentration in exhaust gas.

The output characteristic of the air-fuel ratio sensor however changes by the fuel injection mode. For example, the unevenness in the distribution of fuel concentration in a cylinder is more likely to grow bigger under the direct injection than under the port injection, and thus hydrogen is more easily produced by burning fuel under the direct injection. Meanwhile, the hydrogen ions infiltrate in the solid electrolyte and reduce the electromotive force generated in the solid electrolyte, and therefore the oxygen concentration in exhaust gas is estimated to be lower than it actually is. Consequently, the output of the air-fuel ratio shifts further to the richer side than the actual air-fuel ratio. Such change in the output characteristic not only degrades the accuracy of estimating the actual air-fuel ratio but also is a cause of deteriorating the exhaust gas property of the engine.

An object of the present invention is made in view of the aforementioned problem to provide an engine controlling apparatus that can improve the exhaust gas property of the engine. Another object of the invention is to obtain an effect that cannot be obtained by a conventional technique by using components of an embodiment according to the present invention described below.

Solution to Problems (1) An engine controlling apparatus disclosed herein performs feedback control of a fuel injection amount according to a detection signal from a first sensor that detects an actual air-fuel ratio. The engine controlling apparatus includes a selector that selects one of a plurality of injection modes according to the operating condition of the engine, where injection rates of a plurality of injectors or the number of injections performed in one stroke of the engine differs among the injection modes. The engine controlling apparatus includes a setter that sets a mode correction amount that reflects the output characteristic of the first sensor corresponding to the injection mode. The engine controlling apparatus includes a controller that performs the feedback control using both the detection signal and the mode correction amount.

(2) The engine preferably includes a first injector that injects fuel in a cylinder and a second injector that injects fuel in an air intake passage. The injection modes preferably include a first mode in which the injection rate of the first injector is equal to or higher than the injection rate of the second injector and a second mode different from the first mode. The setter preferably sets the mode correction amount for the first mode to a value in the richer side than the mode correction amount for the second mode.

The first mode preferably includes an MPI+DI single injection mode (port/cylinder single injection mode) and/or an MPI+DI split injection mode (port/cylinder split injection mode). The second mode preferably includes an MPI injection mode (port injection mode) in which the injection rate of the first injector is lower than the injection rate of the second injector.

(3) The injection modes preferably include a split injection mode in which fuel is injected by a plurality of separate injections in one stroke of the engine and a single injection mode in which fuel is injected not by a plurality of separate injections in one stroke of the engine. The setter preferably sets the mode correction amount for the split injection mode to a value in the richer side than the mode correction amount for the single injection mode.

The split injection mode preferably includes an MPI+DI split injection mode (port/cylinder split injection mode). The single injection mode preferably includes an MPI+DI single injection mode (port/cylinder single injection mode).

(4) The setter preferably sets the mode correction amount to a value in the richer side when fuel injection starts at a retarded timing in the split injection mode.

(5) The engine controlling apparatus preferably includes a storage that stores a map specifying the reference value of the detection signal. The controller preferably performs the feedback control according to the difference between the target air-fuel ratio calculated by correcting the reference value with the mode correction amount and the actual air-fuel ratio estimated from the detection signal from the first sensor.

(6) The engine preferably includes a second sensor that detects oxygen concentration in exhaust gas. The controller preferably corrects the reference value according to the oxygen concentration detected by the second sensor.

Advantageous Effects

According to the disclosed engine controlling apparatus, the feedback control of the fuel injection amount can properly be adjusted to totally improve the exhaust gas property of an engine.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

An engine controlling apparatus, or an embodiment of the present invention, will now be described with reference to the drawings. The embodiment is described merely as an example, and various modifications and applicable techniques that are not described may be included within the scope of the invention. Configurations of the described embodiment can be modified and set forth without departing from the spirit and scope of the invention. Components may selectively be used or may be used in combination as required.

1. Configuration

Figure 1:
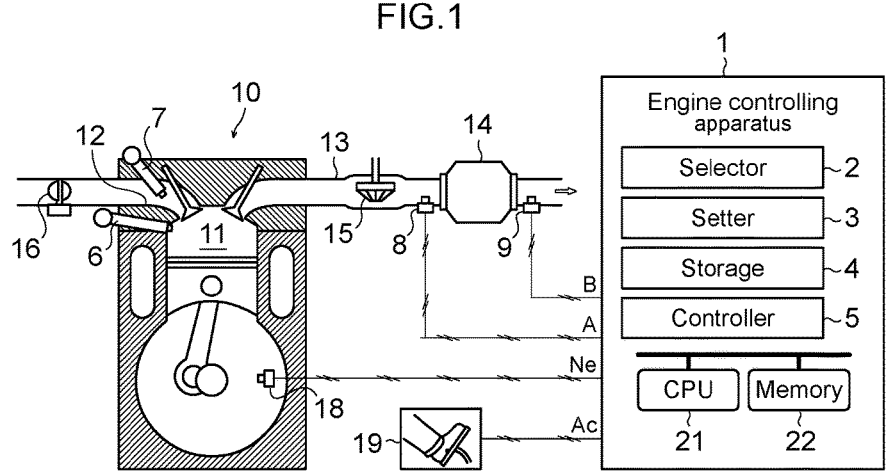
FIG. 1 is a schematic diagram illustrating a configuration of an engine controlling apparatus, or an embodiment of the present invention.

FIG. 1 illustrates an engine 10 mounted on a vehicle and an engine controlling apparatus 1 that controls the engine 10. One of a plurality of cylinders 11 provided in the engine 10 is exemplarily illustrated in the drawing. The engine 10 uses a fuel injection system that adapts direct injection and port injection. Each cylinder 11 is provided with a first injector 6 (direct injector) that injects fuel directly in the cylinder 11 and a second injector 7 (port injector) that injects fuel in an air intake passage. The second injector 7 illustrated in FIG. 1 injects fuel in an air intake port 12. A throttle valve 16 for controlling an amount of intake air is provided in the air intake passage in the upstream of the air intake port 12.

A turbine 15 of a turbocharger is provided in an exhaust passage 13 of the engine 10, and a catalytic unit 14 is provided in the downstream of the turbine 15. The catalytic unit 14 is, for example, a three-way catalyst, a DPF (diesel particulate filter), a NOx (nitrogen oxide) trap reduction catalyst, or an S (sulfur) trap reduction catalyst. A first sensor 8 is provided in the upstream of the catalytic unit 14 (in the exhaust passage 13 between the turbine 15 and the catalytic unit 14). A second sensor 9 is provided in the downstream of the catalytic unit 14. As illustrated in FIG. 1, an engine speed sensor 18 that detects the engine speed Ne (e.g. number of engine rotations per minute) and an accelerator position sensor 19 that detects an accelerator position Ac are provided.

The first sensor 8 is a linear air-fuel ratio sensor that detects an actual air-fuel ratio (a full-range air-fuel ratio sensor, also called LAF sensor). The linear air-fuel ratio sensor is configured with a solid electrolyte covered with a porous material that limits dispersion of exhaust gas (rate-limiting layer). The first sensor 8 measures the electromotive force generated by oxygen ions traveling in the solid electrolyte. The first sensor 8 performs a predetermined processing to the measured electromotive force and outputs the processed result as a detected value A (detection signal). The detected value A reflects the actual air-fuel ratio of the mixed gas supplied to the cylinder 11. The detected value A from the first sensor 8 changes linearly along with the change in the air-fuel ratio.

The second sensor 9 is an oxygen concentration sensor (a zirconia oxygen sensor, also called $O_2$ sensor) having a configuration of the first sensor 8 but without the rate-limiting layer. The second sensor 9 has a characteristic of responding in a binary manner to the change in oxygen concentration such that an output value for an oxygen concentration above the proximity of the theoretical air-fuel ratio and an output value for an oxygen concentration below the proximity of the theoretical air-fuel ratio are significantly different. A detected value B from the second sensor 9 takes a large value when oxygen concentration is low (when the air-fuel ratio is rich) and takes a small value when oxygen concentration is high (when the air-fuel ratio is lean). As in this manner, the second sensor 9 detects the oxygen concentration in exhaust gas. Specifically, the second sensor 9 determines whether the oxygen concentration in exhaust gas corresponds to a rich air-fuel ratio or a lean air-fuel ratio.

The engine controlling apparatus 1 is an electronic controlling apparatus connected to a vehicle-mounted network to manage the operating condition of the engine 10. The engine controlling apparatus 1 is an electronic device in which a processor unit 21, such as a CPU (central processing unit) and an MPU (micro processing unit), and a memory unit 22, such as a ROM (read only memory) and a RAM (random access memory), are integrated. The engine controlling apparatus 1 has a function of giving feedback from a result of controlling the air-fuel ratio to the control and a function of controlling the fuel injection mode in each cylinder 11 provided in the engine 10. The former function is referred as an air-fuel ratio feedback control and the latter function is referred as an injection mode switching control. A program used for the air-fuel ratio feedback control and the injection mode switching control is stored in the memory unit 22 and executed in the processor unit 21.

In the air-fuel ratio feedback control, the fuel injection amount and the intake air amount are controlled so as the actual air-fuel ratio in each cylinder 11 to approach the target air-fuel ratio (the actual air-fuel ratio to eventually be approximately identical to the target air-fuel ratio). The actual air-fuel ratio is recognized by a detected value A from the first sensor 8. The target air-fuel ratio is obtained by correcting the theoretical air-fuel ratio with a detected value B from the second sensor 9. The engine controlling apparatus 1 changes the fuel injection amount of each of the first injector 6 and the second injector 7 or controls the position of the throttle valve 16 so as the difference between the actual air-fuel ratio and the theoretical air-fuel ratio to reach zero.

In the injection mode switching control, the fuel injection mode, such as direct injection and port injection, is selected according to the operating condition of the engine 10 and the output power required of the engine 10. One of the injection modes is selected according to the engine speed Ne and the load Ec (e.g. charging efficiency of the engine 10). In the embodiment, the injection mode is selected among three injection modes, that is, an MPI injection mode (port injection mode), an MPI+DI single injection mode (port/cylinder single injection mode), and an MPI+DI split injection mode (port/cylinder split injection mode). The load Ec of the engine 10 is calculated by a known processing method according to the engine speed Ne and the accelerator position Ac. "MPI" is the abbreviated name for multi-port injection, and "DI" is the abbreviated name for direct injection.

The MPI injection mode (a second mode), in which the second injector 7 is mainly used to inject fuel, is selected when the engine 10 operates under a relatively low load and a low rotational speed. In the MPI injection mode of the embodiment, the first injector 6 halts fuel injection and only the second injector 7 injects fuel. That is, in the MPI injection mode, the injection rate of the first injector 6 is lower than the injection rate of the second injector 7. The period in which port injection is performed is mainly set in the exhaust stroke. The period in which port injection is performed may be set immediately before the exhaust stroke (in the late period in the combustion stroke) or immediately after the exhaust stroke (in the early period in the intake stroke) as required.

The MPI+DI single injection mode and the MPI+DI split injection mode, in which the first injector 6 is mainly used to inject fuel, are selected when the engine 10 operates under a relatively high load Ec or a relatively high engine speed Ne compared to the MPI injection mode. In the MPI+DI single injection mode and the MPI+DI split injection mode, at least the first injector 6 is used or the first injector 6 and the second injector 7 are used in parallel to inject fuel. In the MPI+DI single injection mode and the MPI+DI split injection mode of the embodiment, the injection rate of the first injector 6 is equal to or higher than the injection rate of the second injector 7. Such mode, in which the injection rate of the first injector 6 is equal to or higher than the injection rate of the second injector 7, is referred as a "first mode", whereas a mode in which the injection rate of the first injector 6 is lower than the injection rate of the second injector 7 is referred as a "second mode".

In the MPI+DI single injection mode, at least the first injector 6 injects fuel by a single injection. In the single injection, fuel injection in one stroke of the engine 10 is not separated into a plurality of injections. Meanwhile, in the MPI+DI split injection mode, at least the fuel injection from the first injector 6 is separated. In the split injection, fuel injection in one stroke of the engine 10 is separated into a plurality of injections. The MPI+DI split injection mode is used when the load Ec of the engine 10 is higher than the load Ec in the MPI+DI single injection mode.

In the embodiment described above, the direct injection amount in each of the MPI+DI single injection mode and the MPI+DI split injection mode is set to be equal to or higher than at least the port injection amount. That is, the ratio of the injection rate of the port injection to the injection rate of the direct injection ("port injection": "direct injection") is set to 1 or below (for example, 0:10, 1:9, 2:8, . . . , 5:5). In contrast, the MPI injection mode is an example mode in which the injection rate of the first injector 6 is lower than the injection rate of the second injector 7 (a mode other than the second mode and the first mode). The ratio of the injection rate of the port injection to the injection rate of the direct injection in the MPI injection mode ("port injection": "direct injection") is set to be higher than 1 (for example, 6:4, 7:3, . . . , 9:1, 10:0).

As in a manner similar to the MPI injection mode, the period in which the port injection is performed in the MPI+DI single injection mode and the MPI+DI split injection mode is set mainly in the exhaust stroke. The period of port injection may be set immediately before the exhaust stroke (the late period in the combustion stroke) or immediately after the exhaust stroke (the early period in the intake stroke) as required. Meanwhile, the period in which the direct injection is performed is retarded than at least the period of port injection. In the embodiment, the direct injection in the MPI+DI single injection mode is performed in the intake stroke. The direct injection in the MPI+DI split injection mode is separated into two injections which are respectively performed in the intake stroke and the compression stroke.

Figure 2:
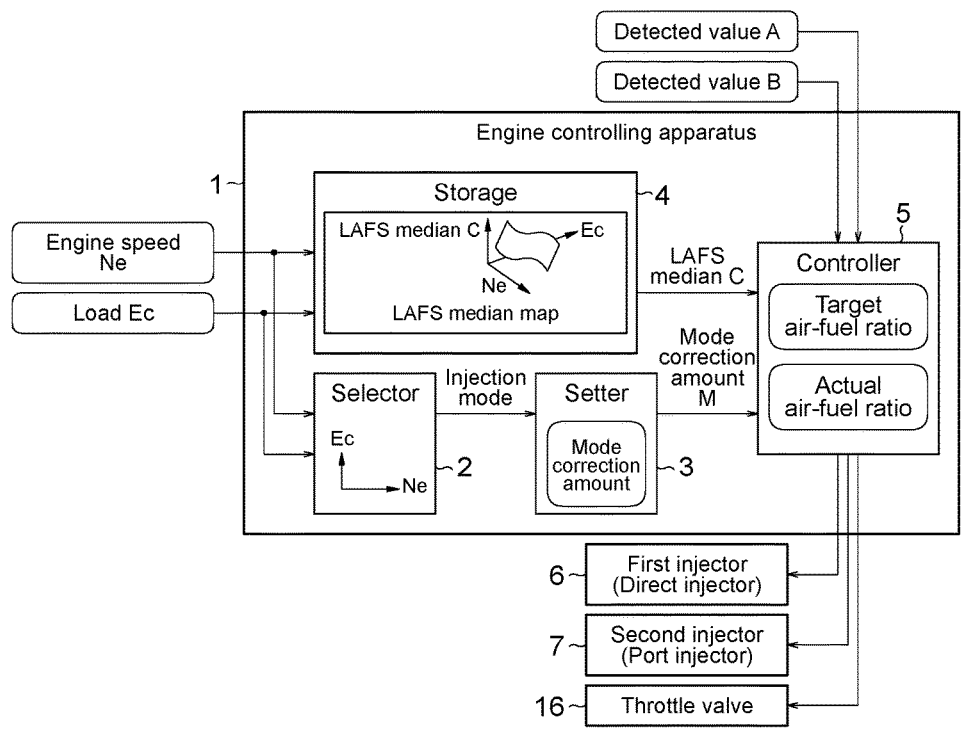
FIG. 2 is a block diagram of the engine controlling apparatus.

FIG. 2 is a block diagram schematically illustrating the function of the engine controlling apparatus 1. The engine controlling apparatus 1 is provided with a selector 2, a changer 3, and a controller 4. In the embodiment, each of the functions is performed by the processor unit 21 and the software stored in the memory unit 22. At least one or all of the functions may be performed by hardware (an electronic circuit) or by both software and hardware.

1-1. Selector

Figure 3A:
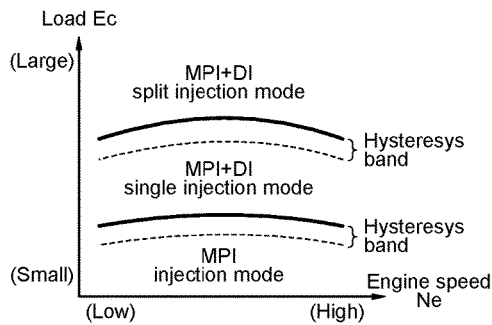
FIGS. 3A and 3B are example maps for setting an injection mode.
Figure 3B:
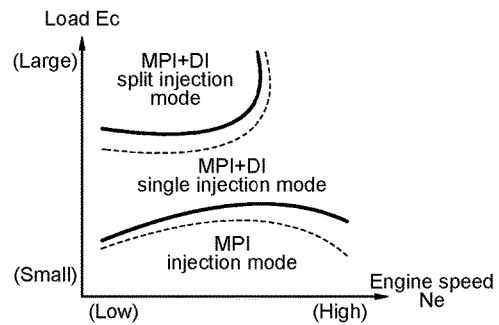

The selector 2 controls switching of the injection mode to alternatively select the injection mode according to the operating condition of the engine 10. A formula, a graph, and a map, for example, for specifying the relationship between the operating condition of the engine 10 and a plurality of injection modes is previously provided in the selector 2. The embodiment has three injection modes (the MPI injection mode, the MPI+DI single injection mode, and the MPI+DI split injection mode). As illustrated in FIG. 3A, one of the injection modes is assigned to an operating point of the engine 10 specified by the engine speed Ne and the load Ec. The information on the selected injection mode is transmitted to a setter 3. The number of injection modes on the map, styles of injection modes, and the specific form of injection in each injection mode can arbitrarily be determined, and can be determined according to, for example, the characteristic of the engine 10, the fuel injection properties of the first injector 6 and the second injector 7, or the characteristic of the vehicle on which the engine 10 is mounted as illustrated in FIG. 3B.

The boundary between injection modes on the map has hysteresis property (history property). In FIG. 3A, for example, when the operating point of the engine 10 moves from the MPI injection mode to the MPI+DI single injection mode, the injection mode changes from the MPI injection mode to the MPI+DI single injection mode when the operating point crosses the boundary illustrated in a solid line in the figure. When the operating point moves in a reverse direction, the injection mode changes from the MPI+DI single injection mode to the MPI injection mode when the operating point crosses the boundary illustrated in a dashed line in the figure. The boundary between the MPI+DI single injection mode and the MPI+DI split injection mode has a similar characteristic. By providing a hysteresis band on the boundary between injection modes, fluctuating change in the injection mode at or near the boundary is suppressed and thus the stability of switching control of the injection mode can be improved.

1-2. Setter

The setter 3 sets a mode correction amount M according to the injection mode selected by the selector 2. The mode correction amount M is a parameter for correcting the target air-fuel ratio in the air-fuel ratio feedback control. For example, the corrected target air-fuel ratio takes a value calculated by adding the mode correction amount M to (or subtracting the mode correction amount M from) the pre-corrected target air-fuel ratio or a value calculated by multiplying (or dividing) the pre-corrected target air-fuel ratio by the mode correction amount M. In the embodiment, the mode correction amount M is set for each injection mode as illustrated in Table 1. The information on the mode correction amount M as provided in Table 1 is transferred to the controller 5.

TABLE 1

| Injection mode | Mode correction amount M |
| --- | --- |
| MPI injection mode | $M_1$ (=0) |
| MPI + DI single injection mode | $M_2$ |
| MPI + DI split injection mode | $M_3$ |

The mode correction amount M reflects the output characteristic of the first sensor 8 according to the injection mode. The output characteristic is the way the detected value A changes by the injection mode. An example of the output characteristic is the shift of the detected value A to the richer side along with the increase in the injection rate of the cylinder injection to be higher than the injection rate of the port injection or the shift of the detected value A to the richer side along with the increase in the number of fuel injections (the number of separate injections) in one stroke of the engine 10.

The detected value A from the first sensor 8 takes a value corresponding to the electricmotive force of the solid electrolyte generated by traveling of oxygen ions, which value corresponding to the actual air-fuel ratio. The correspondence relationship between the detected value A and the actual air-fuel ratio is basically unchanged unless there is any other factor affecting the electricmotive force of the solid electrolyte. However, the amount of generated hydrogen in exhaust gas differs among different injection modes in the engine 10 because the distribution of fuel concentration in the cylinder 11 differs among injection modes. The hydrogen in exhaust gas disperses in the solid electrolyte as hydrogen ions and could affect the electricmotive force. Therefore, the change in the injection mode in the engine 10 may cause deviation in the correspondence relationship between the detected value A and the actual air-fuel ratio.

The mode correction amount M is thus determined taking such deviation in consideration. For example, taking the MPI injection mode as reference (for example, setting the mode correction amount $M_1$ for the MPI injection mode to zero), the mode correction amount $M_2$ for the MPI+DI single injection mode is set to a value in the richer side than $M_1$ (a value corresponding to a small target air-fuel ratio: for example, $0=M_1<M_2$). The mode correction amount $M_2$ takes a value that corresponds to a difference or a ratio between detected values A which are a value detected in the MPI injection mode while the actual air-fuel ratio is the theoretical air-fuel ratio and a value detected in the MPI+DI single injection mode while the actual air-fuel ratio is the theoretical air-fuel ratio. The mode correction amount $M_3$ for the MPI+DI split injection mode is set to a value further in the richer side than the mode correction amount $M_2$ (a value corresponding to a further smaller target air-fuel ratio: for example, $M_2<M_3$). The mode correction amount $M_3$ takes a value that corresponds to a difference or a ratio between detected values A which are a value detected in the MPI injection mode while the actual air-fuel ratio is the theoretical air-fuel ratio and a value detected in the MPI+DI split injection mode while the actual air-fuel ratio is the theoretical air-fuel ratio.

As described above, the mode correction amount M takes a value further in the richer side as the injection rate of the cylinder injection or the number of fuel injections increases to be higher than the port injection. This is because the degree of shift to the richer side (the degree of being deceived to the richer side) of the detected value A from the first sensor 8 takes the smallest value in the MPI injection mode and the largest value in the MPI+DI split injection mode.

Figure 4A:
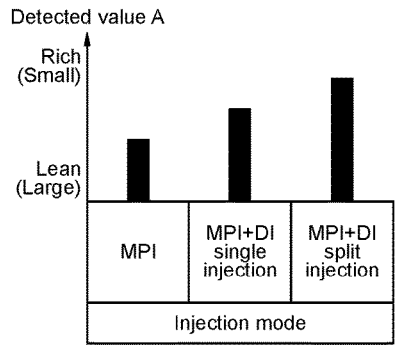
FIG. 4A is a bar chart illustrating the relationship between the injection mode and a detected value A.

FIG. 4A is a chart illustrating the detected value A detected by the first sensor 8 in different injection modes under the same condition with a constant actual air-fuel ratio. The detected value A takes the largest value in the MPI injection mode, that is, the detected result is in the lean side. The detected value A takes the smallest value in the MPI+DI split injection mode, that is, the detected result is in the rich side. The mode correction amount M for each injection mode is set to conform to the changing output characteristic of the first sensor 8.

1-3. Storage

A storage 4 stores a LAFS median map specifying the reference value of the detected value A from the first sensor 8. The reference value corresponding to the operating condition of the engine 10 and the output power required of the engine 10 is set in the LAFS median map. The reference value is the average of the detected value A detected by the first sensor 8 in a predetermined injection mode while the actual air-fuel ratio is the theoretical air-fuel ratio, which reference value corresponding to the target air-fuel ratio in the air-fuel ratio feedback control. Hereinafter, the reference value is also referred as a LAFS median C. FIG. 3 illustrates a three dimensional map specifying the relationship among the engine speed Ne, the load Ec, and the LAFS median C. In the embodiment, the average of the detected value A in the MPI injection mode is set as the LAFS median C.

The storage 4 has a function of calculating the LAFS median C corresponding to the operating condition of the engine 10 according to the LAFS median map. That is, one LAFS median C is calculated for the operating point of the engine 10 specified by the engine speed Ne and the load Ec. The information on the calculated LAFS median C is transmitted to the controller 5.

1-4. Controller

The controller 5 performs the air-fuel ratio feedback control using at least the detected value A from the first sensor 8 and the mode correction amount M set in the setter 3. The feedback correction amount is basically calculated according to the difference D between the actual air-fuel ratio and the target air-fuel ratio. The actual air-fuel ratio is calculated according to the detected value A detected by the first sensor 8, and the target air-fuel ratio is calculated according to the LAFS median C. Meanwhile, in the embodiment, the target air-fuel ratio is corrected according to the detected value B from the second sensor 9 and the mode correction amount M. The controller 5 performs the air-fuel ratio feedback control according to the difference D between the value derived by correcting the LAFS median C with the mode correction amount M and the actual air-fuel ratio estimated from the detected value A from the first sensor 8.

Then the first injector 6, the second injector 7, and the throttle valve 16 are controlled so as the actual air-fuel ratio to approach the target air-fuel ratio (the difference D to approach zero). In the embodiment, the feedback correction amount corresponding to the difference D between the target air-fuel ratio and the actual air-fuel ratio is calculated, and the next fuel injection amount is increased or decreased to be corrected according to the feedback correction amount.

Taking the LAFS median C as reference, the target air-fuel ratio is corrected according to the detected value B from the second sensor 9 and the mode correction amount M. For example, when the detected value B is equal to or larger than a first predetermined value, determination is made that the oxygen concentration is low (the air-fuel ratio is rich), and correction is made by shifting the target air-fuel ratio to the leaner side. In this correction, for a longer continuous time period in which the detected value B is equal to or larger than the first predetermined value, the target air-fuel ratio is shifted further to the leaner side. When the detected value B is equal to or smaller than a second predetermined value that is smaller than the first predetermined value, determination is made that the oxygen concentration is high (the air-fuel ratio is lean), and correction is made by shifting the target air-fuel ratio to the richer side. In this correction, for a longer continuous time period in which the detected value B is equal to or smaller than the second predetermined value, the target air-fuel ratio is shifted further to the richer side. Meanwhile, for a larger mode correction amount M, determination is made that the detected value A from the first sensor 8 is more likely to shift to the richer side, so that correction is made by shifting the target air-fuel ratio to the richer side. As a result, the target air-fuel ratio of the MPI+DI single injection mode is in the richer side than the target air-fuel ratio of the MPI injection mode, and the target air-fuel ratio of the MPI+DI split injection mode is in the richer side than the target air-fuel ratio of the MPI+DI single injection mode.

The actual air-fuel ratio is calculated according to the detected value A from the first sensor 8. As described above, the correspondence relationship between the detected value A and the actual air-fuel ratio changes as the injection mode of the engine 10 changes. In the embodiment, however, the target air-fuel ratio reflects the mode correction amount M set for each injection mode, so that a deviation in correspondence relationship related to the injection mode is cancelled. Therefore, the actual air-fuel ratio can be calculated according to the typical correspondence relationship between the detected value A and the actual air-fuel ratio (for example, the correspondence relationship in the MPI injection mode) without considering the difference of the deviation in correspondence relationship.

The controller 5 calculates the difference D between the target air-fuel ratio and the actual air-fuel ratio, and calculates a feedback correction amount corresponding to the difference D. Then, by reflecting the feedback correction amount on the next fuel injection amount, the difference D gradually approaches zero by the feedback effect, namely, the actual air-fuel ratio converges to the target air-fuel ratio. A specific method of the air-fuel ratio feedback control is not limited to the method described above. A known feedback method can be used. A known fault diagnosis control that diagnoses the sensing performance of the first sensor 8 by slightly changing of the target air-fuel ratio may additionally be used.

2. Flow Chart

Figure 5:
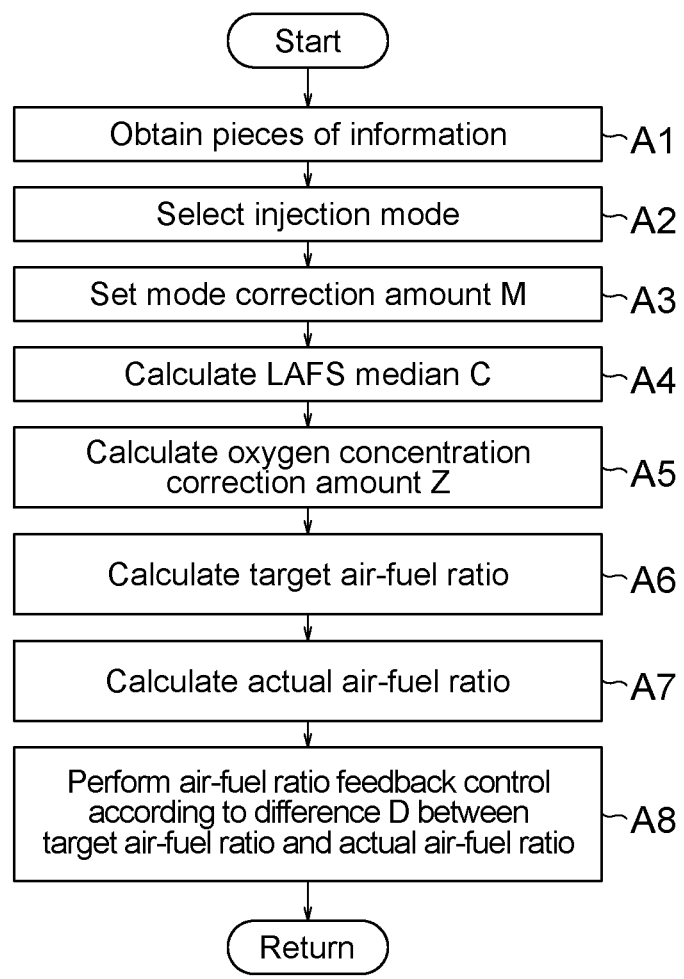
FIG. 5 is a flow chart illustrating how the control is performed by the engine controlling apparatus.

FIG. 5 illustrates a procedure of the air-fuel ratio feedback control and injection mode switching control. The engine controlling apparatus 1 repetitively performs the control illustrated in the flow chart by a predetermined cycle. Pieces of information (e.g., the detected value A, the detected value B, the engine speed Ne, and the accelerator position Ac) are obtained (A1 in FIG. 5), and the load Ec of the engine 10 is calculated. The selector 2 selects the injection mode corresponding to the operating point of the engine 10 according to the engine speed Ne and the load Ec (A2). The setter 3 sets the mode correction amount M corresponding to the injection mode (A3). If the injection mode has been changed from the mode in the preceding control cycle, the mode correction amount M is also immediately changed.

According to the LAFS median map, the engine speed Ne, and the load Ec, LAFS median C is calculated (A4). The calculated LAFS median C is used as reference for the target air-fuel ratio in the air-fuel ratio feedback control. The controller 5 calculates an oxygen concentration correction amount Z according to the detected value B detected by the second sensor 9 (A5). For example, the oxygen concentration correction amount Z is set to a larger value in the positive range for a larger detected value B (for a richer air-fuel ratio). The absolute value of the oxygen concentration correction amount Z is set to a further larger value for a longer time period in which the detected value B is in the richer side. Thus the target air-fuel ratio easily shifts to the leaner side. Meanwhile, the oxygen concentration correction amount Z is set to a larger value in the negative range for a smaller detected value B (for a leaner air-fuel ratio). The absolute value of the oxygen concentration correction amount Z is set to a further larger value for a longer time period in which the detected value B is in the leaner side.

The final target air-fuel ratio is calculated by adding the oxygen concentration correction amount Z to and subtracting the mode correction amount M from the LAFS median C (A6). The actual air-fuel ratio is calculated according to the detected value A detected by the first sensor 8 (A7). The difference D between the target air-fuel ratio and the actual air-fuel ratio is calculated, and the air-fuel ratio feedback control is performed according to the difference D (A8). For example, a feedback correction amount corresponding to the difference D is calculated, and the first injector 6 and the second injector 7 are controlled to increase or decrease the fuel injection amounts and the position of the throttle valve 16 is controlled to open or close, and thereby the difference D gradually approaches zero.

3. Effects (1) In the engine controlling apparatus 1 illustrated in Table 1, the mode correction amount M is set for each of the injection modes that have different injection rates or different numbers of fuel injections. By performing the air-fuel ratio feedback control using both the mode correction amount M and the detected value A from the first sensor 8, the target air-fuel ratio can immediately be changed to a value appropriate for the injection mode without being affected by the injection mode. That is, the accuracy of calculating the feedback correction amount can be improved so that the air-fuel ratio feedback control can properly be performed even with the change in the injection mode. Thus, the exhaust gas property of the engine 10 can totally be improved. For example, the convergence of the actual air-fuel ratio to the target air-fuel ratio is improved and the actual air-fuel ratio being excessively lean is prevented, so that NOx can be reduced. Furthermore, the actual air-fuel ratio being excessively rich is prevented, so that CO can be reduced.

(2) When the injection mode switches from the MPI injection mode (the second mode) to the MPI+DI single injection mode or the MPI+DI split injection mode (the first mode), the fuel injection from the first injector 6 causes variation in the distribution of fuel concentration in the cylinder 11, so that the detection signal from the first sensor 8 tends to shift further to the richer side than it actually is. Considering such state is to happen, the engine controlling apparatus 1 sets the mode correction amounts $M_2$ and $M_3$ for the MPI+DI single injection mode and the MPI+DI split injection mode (the first mode) to be in the richer side than the mode correction amount $M_1$ for the MPI injection mode (the second mode). In this manner, inappropriate feedback due to erroneous detection of the actual air-fuel ratio by the first sensor 8 can be prevented, and thus an appropriate fuel injection amount can be determined. Consequently, the exhaust gas property of the engine 10 can be improved.

(3) Similarly, when the injection mode switches from the MPI+DI single injection mode to the MPI+DI split injection mode, the distribution of fuel concentration in the cylinder 11 tends to be uneven and the detection signal from the first sensor 8 tends to shift to the richer side. Considering such state is to happen, the engine controlling apparatus 1 sets the mode correction amount $M_3$ for the MPI+DI split injection mode to be in the richer side than the mode correction amount $M_2$ for the MPI+DI single injection mode. In this manner, inappropriate feedback due to erroneous detection of the actual air-fuel ratio by the first sensor 8 can be prevented, and thus an appropriate fuel injection amount can be determined. Consequently, the exhaust gas property of the engine 10 can be improved.

(4) In the engine controlling apparatus 1, the target air-fuel ratio is not only given by the LAFS median map but also corrected with the mode correction amount M. Then, the feedback correction amount corresponding to the difference D between the corrected target air-fuel ratio and the actual air-fuel ratio is calculated. By performing the air-fuel ratio feedback control using the feedback correction amount, the fuel injection amount can be adjusted to be close to the optimum value in each injection mode. In this manner, sufficient accuracy of detecting the actual air-fuel ratio can be kept even with the change in the injection mode, and thus the convergence of the air-fuel ratio feedback control is improved.

(5) In the engine controlling apparatus 1, the oxygen concentration correction amount Z is calculated according to the detected value B from the second sensor 9 and the target air-fuel ratio (reference value) is corrected according to the oxygen concentration correction amount Z. In this manner, the reliability of fuel correction can be improved, and thereby the convergence of the air-fuel ratio feedback control can further be improved.

4. Exemplary Modification

Although the mode correction amount M is set according to the injection mode in the described embodiment, the mode correction amount M may be changed according not only to the injection mode but also to the timing of starting fuel injection. For example, in the MPI+DI single injection mode, the mode correction amount M may be set to be further in the richer side for a retarded timing of starting fuel injection from the first injector 6. Furthermore, in the MPI injection mode, the mode correction amount M may be set to be further in the richer side for a retarded timing of starting fuel injection from the second injector 7.

Figure 4B:
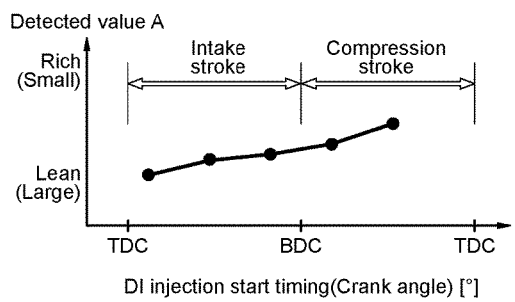
FIG. 4B is a line chart illustrating the relationship between a timing of starting fuel injection from a first injector and the detected value A.

FIG. 4B illustrates the relationship between the timing of starting fuel injection by the first injector 6 and the detected value A from the first sensor 8. As fuel injection starts at a retarded timing, the time allowed for the fuel to disperse is reduced. This reduction in disperse time causes greater variation in distribution of fuel concentration in the cylinder 11, which likely causes a shift of the detection signal from the first sensor 8 to the richer side than it actually is. Therefore, by changing the mode correction amount M according to the timing of starting fuel injection, inappropriate feedback due to erroneous detection by the first sensor 8 can be prevented, and thereby an appropriate air-fuel ratio can be determined. Consequently, the exhaust gas property of the engine 10 can be improved.

Although the target air-fuel ratio is calculated by adding the oxygen concentration correction amount Z to the LAFS median C and subtracting the mode correction amount M in the described embodiment, a specific processing method of reflecting the oxygen concentration correction amount Z and the mode correction amount M on the feedback correction amount is not limited to the described method. For example, the oxygen concentration correction amount Z and the mode correction amount M may be used as gains, that is, the LAFS median C may be multiplied by the oxygen concentration correction amount Z and divided by the mode correction amount M to calculate the target air-fuel ratio. Alternatively, the LAFS median map may be omitted and a parameter corresponding to the LAFS median C may be calculated according to the operating condition of the engine 10, and then the target air-fuel ratio may be calculated by correcting the parameter with the mode correction amount M. Whether any processing method is used, an effect similar to the effect obtained by the described embodiment can be obtained by performing feedback control using both the detected value from the first sensor 8 and the mode correction amount M.

REFERENCE SIGNS LIST

1 ENGINE CONTROLLING APPARATUS
2 SELECTOR
3 SETTER
4 STORAGE
5 CONTROLLER
6 FIRST INJECTOR (DIRECT INJECTOR)
7 SECOND INJECTOR (PORT INJECTOR)
8 FIRST SENSOR (AIR-FUEL SENSOR)
9 SECOND SENSOR (OXYGEN CONCENTRATION SENSOR)
10 ENGINE
11 CYLINDER
12 INTAKE PORT
13 EXHAUST PASSAGE
14 CATALYTIC UNIT
15 TURBINE
16 THROTTLE VALVE
18 ENGINE SPEED SENSOR
19 ACCELERATOR POSITION SENSOR

What is claimed is:

1. An engine controlling apparatus configured to perform feedback control of a fuel injection amount according to a detection signal from a first sensor that detects an actual air-fuel ratio, the engine controlling apparatus comprising:
a processor: and
a memory that stores a program that causes the processor to
select, as a selector, one of a plurality of injection modes according to an operating condition of an engine, injection rates of a plurality of injectors or the number of injections performed in one stroke of the engine being different among the injection modes, where a change in the injection mode may cause deviation in the correspondence relationship between the detected value from the first sensor and the actual air-fuel ratio;

set, as a setter, a mode correction amount that reflects output characteristic of the first sensor corresponding to the injection mode, the setter setting the mode correction amount according to a timing of starting fuel injection of a first injector during a respective injection mode so that when the injection mode changes between the plurality of injection modes, the mode correction amount shifts to a richer side as the start timing of the first injector is more retarded from one injection mode to another injection mode thereby taking into consideration the deviation caused by the change in injection mode, and perform, as a controller, the feedback control using both the detection signal and the mode correction amount such that the fuel injection amount is controlled based on a difference between the actual air-fuel ratio and a target air-fuel ratio, wherein the actual air-fuel ratio is calculated based on the detection signal, and the target air-fuel ratio is calculated by correcting a reference value, corresponding to a LAPS median C, based on a second detected signal from a second sensor and the mode correction amount.

2. The engine controlling apparatus according to claim 1, wherein
the first injector injects fuel in a cylinder and a second injector injects fuel in an air intake passage,
the injection modes include a first mode and a second mode different from the first mode, an injection rate of the first injector being equal to or higher than an injection rate of the second injector in the first mode, and
the setter sets the mode correction amount for the first mode to a value in a richer side than the mode correction amount set for the second mode.

3. The engine controlling apparatus according to claim 1, wherein
the injection modes include a split injection mode and a single injection mode, fuel being injected by a plurality of separate injections in one stroke of the engine in the split injection mode, fuel being injected not by a plurality of separate injections in one stroke of the engine in the single injection mode, and
the setter sets the mode correction amount for the split injection mode to a value in a richer side than the mode correction amount set for the single injection mode.

4. The engine controlling apparatus according to claim 1, wherein
the memory stores a map specifying a reference value of the detection signal, and
the processor is configured to perform the feedback control according to a difference between a target air-fuel ratio calculated by correcting the reference value with the mode correction amount and the actual air-fuel ratio estimated from the detection signal from the first sensor.

5. The engine controlling apparatus according to claim 4, further comprising:
a second sensor that detects oxygen concentration in exhaust gas, and
wherein the processor is further configured to correct the reference value according to the oxygen concentration detected by the second sensor and the set mode correction amount.

* * * * *